United States Patent
Douthitt et al.

(10) Patent No.: US 12,492,009 B2
(45) Date of Patent: Dec. 9, 2025

(54) FLIGHT RECORDER SYSTEM AND METHOD FOR SYNCHRONIZING ADC SAMPLING RATES

(71) Applicant: GENERAL ELECTRIC COMPANY, Schenectady, NY (US)

(72) Inventors: Brian Lynn Douthitt, Holland, MI (US); Andrew David Vogeli, Byron Center, MI (US)

(73) Assignee: General Electric Company, Evendale, OH (US)

( * ) Notice: Subject to any disclaimer, the term of this patent is extended or adjusted under 35 U.S.C. 154(b) by 287 days.

(21) Appl. No.: 18/321,830

(22) Filed: May 23, 2023

(65) Prior Publication Data

US 2024/0391605 A1 Nov. 28, 2024

(51) Int. Cl.
*B64D 45/00* (2006.01)

(52) U.S. Cl.
CPC ...... *B64D 45/00* (2013.01); *B64D 2045/0065* (2013.01); *B64D 2045/0085* (2013.01)

(58) Field of Classification Search
None
See application file for complete search history.

(56) References Cited

U.S. PATENT DOCUMENTS

| 10,511,403 | B2* | 12/2019 | Bush | H04L 63/061 |
|---|---|---|---|---|
| 10,892,839 | B2* | 1/2021 | Chen | H04J 3/0667 |
| 11,100,726 | B2* | 8/2021 | Krupa | G08G 5/22 |
| 2007/0124042 | A1 | 5/2007 | Monroe | |
| 2010/0234718 | A1 | 9/2010 | Sampath | |
| 2013/0010812 | A1 | 1/2013 | Carro | |
| 2021/0076966 | A1 | 3/2021 | Grantcharov | |
| 2021/0258095 | A1 | 8/2021 | Bush et al. | |
| 2021/0329584 | A1 | 10/2021 | Prakash et al. | |
| 2022/0046570 | A1 | 2/2022 | Moon et al. | |
| 2022/0322259 | A1 | 10/2022 | Zhuge | |
| 2022/0345417 | A1 | 10/2022 | Kasichainula et al. | |

FOREIGN PATENT DOCUMENTS

| WO | 2020114129 A1 | 6/2020 |
|---|---|---|
| WO | 2021/141296 A1 | 7/2021 |

* cited by examiner

*Primary Examiner* — James J Lee
*Assistant Examiner* — Jonathan E Reinert
(74) *Attorney, Agent, or Firm* — McGarry Bair PC

(57) ABSTRACT

A flight recorder system of an aircraft includes a cockpit voice and flight data recorder communicatively coupled, via a data communication network, to a first flight recorder module (FRM). The first FRM includes a first sensor configured to generate a first analog signal, a first controller, and a first analog to digital converter (ADC) configured to sample the analog signal based on a received master clock signal and to convert the first analog signal to a first digital data signal.

20 Claims, 3 Drawing Sheets

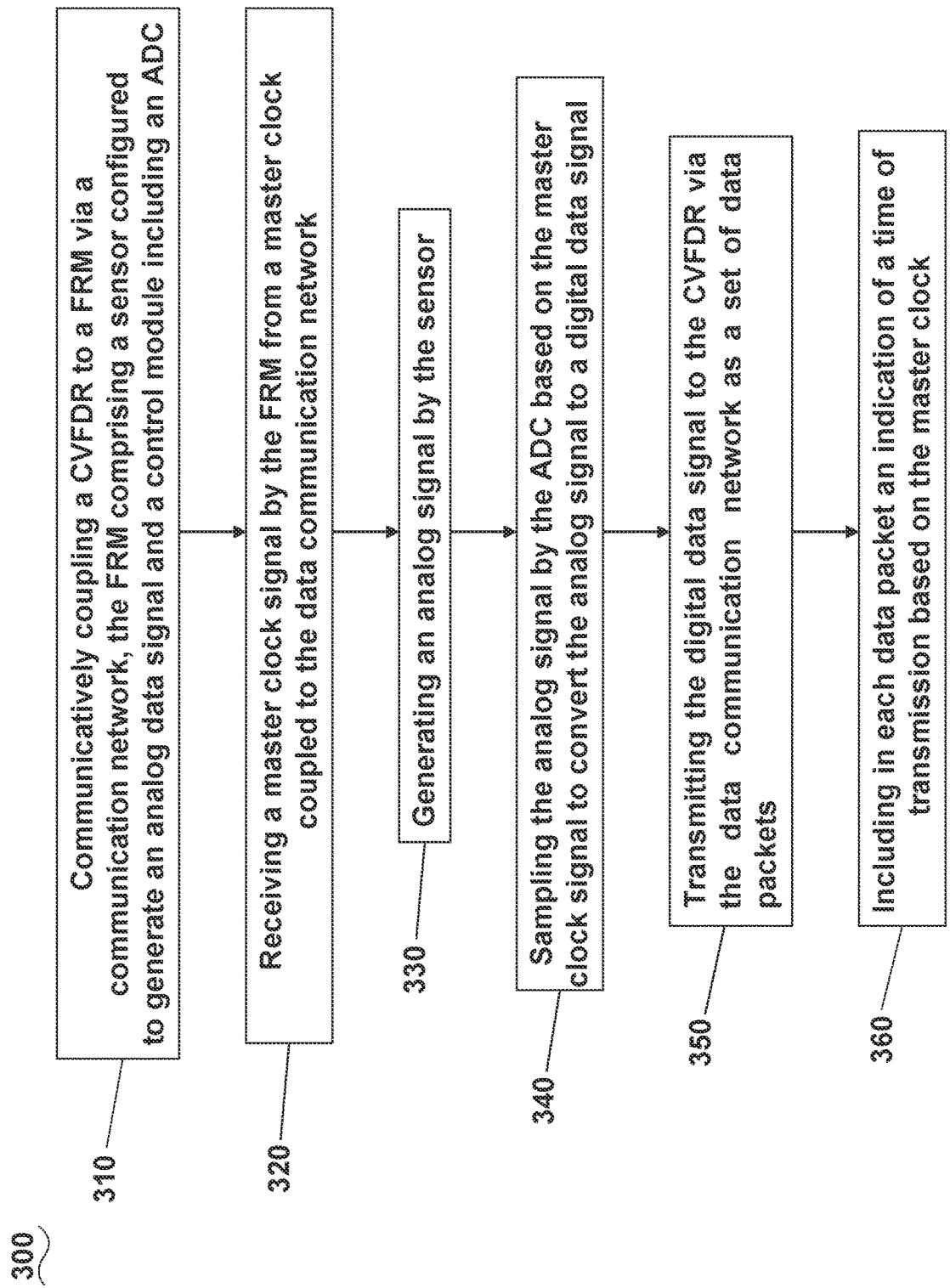

FLIGHT RECORDER SYSTEM AND METHOD FOR SYNCHRONIZING ADC SAMPLING RATES

TECHNICAL FIELD

This disclosure relates generally to aircraft flight recorders, and more specifically to a flight recorder system and a method of operation of a flight recorder.

BACKGROUND

Flight recorders (sometimes called 'black box' recorders) are devices used to acquire and store information about the operation and status of an aircraft during a flight. This information can be analyzed in response to an unexpected event or accident involving the aircraft and can help reconstruct the events leading to the event. Flight recorders are installed on certain aircraft, typically large or passenger carrying aircraft, and conform to international aviation authority standards. For example, flight recorders are mandated for commercial aircraft by the Federal Aviation Administration (FAA) in the United Stated (U.S.), and the European Union Aviation Safety Agency (EASA) in the European Union.

Typically, a cockpit voice recorder (CVR) is provided to record a flight crew's voices, as well as other sounds inside the aircraft cockpit. The CVR includes a "cockpit area microphone" to capture sounds of interest such as engine noise, stall warnings, landing gear extension and retraction, and other clicks and pops. From these sounds, parameters such as engine revolutions per minute (rpm), system failures, speed, and the time at which certain events occur can often be determined. Communications with Air Traffic Control, automated radio weather briefings, and conversation between the pilots and ground or cabin crew are also recorded. Other examples of information captured and stored on the flight data recorder include position, speed, altitude, engine speed and rudder position, however modern flight data recorders can often track, store, and analyze hundreds of parameters.

BRIEF DESCRIPTION OF THE DRAWINGS

A full and enabling disclosure of the present description, including the best mode thereof, directed to one of ordinary skill in the art, is set forth in the specification, which refers to the appended FIGS., in which:

FIG. 3 is a flow chart diagram illustrating a method of operating a flight recorder system in accordance with aspects described herein.

DETAILED DESCRIPTION

Figure 1:
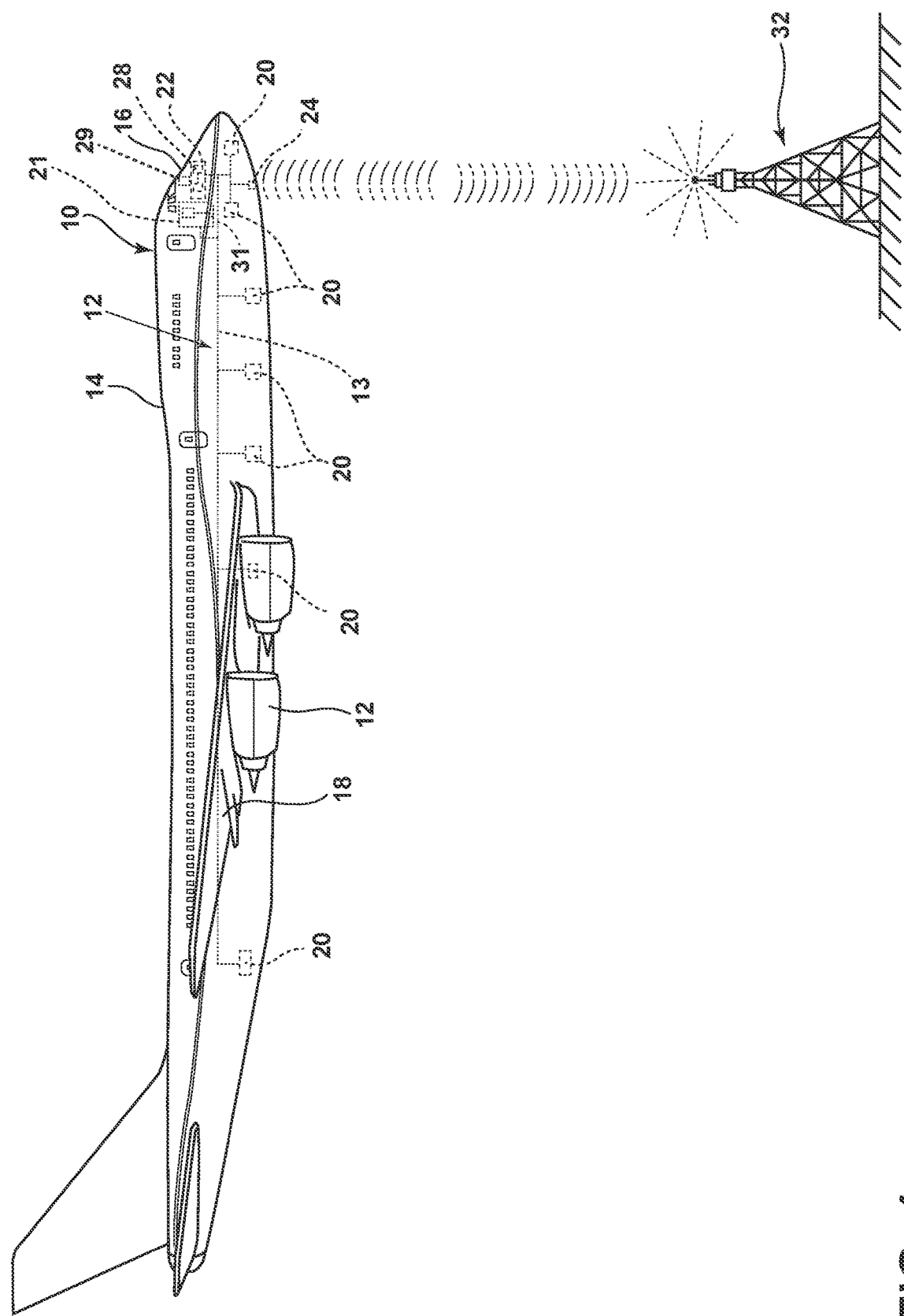
FIG. 1 is a schematic illustration of an aircraft and ground system in accordance with aspects described herein.

For purposes of illustration and discussion, the present disclosure will be described with respect to a flight recorder system for an aircraft. It will be understood that the disclosure can have applicability in other vehicles or systems, and can be used to provide benefits in industrial, commercial, and residential applications that use or require recorded data.

The exemplary drawings are for purposes of illustration only and the dimensions, positions, order and relative sizes reflected in the drawings attached hereto can vary.

As used herein, all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Furthermore, as used herein, the term "set" or a "set" of elements can be any number of elements, including only one.

As used herein, a "controller" or "controller module" can include a component configured or adapted to provide instruction, control, operation, or any form of communication for operable components to affect the operation thereof. A controller module can include, without limitation, any known processor, microcontroller, System-on-Chip (SoC), or logic devices. Such logic devices can include but are not be limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (PC), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof.

Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. As used herein, the terms "program code" "software", and "firmware" can be used interchangeably, and can be used to describe operable or executable instruction sets that can include routines, programs, code, bit streams, objects, components, data structures, algorithms, etc., that have the technical effect of performing particular tasks or implementing particular abstract data types. When implemented in software or firmware, various aspects as described herein can include code segments or instructions that perform the various tasks. It should be appreciated that the various block components shown in the figures can be realized by any number of hardware, software, or firmware components, or combinations thereof, configured to perform the specified functions.

In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Conventional flight recorders are electronic recording devices or modules installed in an aircraft to facilitate the investigation of aviation accidents and incidents. Typically, flight recorders continually monitor the current operating conditions and performance of the aircraft via a large number of sensors or other data sources located around the aircraft. The data from the sensors can be provided to a flight recorder module (FRM) which provides the data to a Cockpit Voice Recorder (CVR), or a Flight Data Recorder (FDR) via a data communication system of the aircraft. The CVR records radio transmissions and sounds in the cockpit, such as the pilot's voices and engine noises. The Flight Data Recorder (FDR), monitors specific aircraft performance parameters such as altitude, airspeed, heading, vertical acceleration, time, nose heading, steering wheel position, rudder pedal position, steering wheel position, horizontal stabilizer, and fuel flow. Some sensor data can also be provided directly to the flight recorder. In some cases, the CVR and FDR can be combined into a single unit, Cockpit Voice and Flight Data Recorder (CVFDR). As will be used herein, for ease of description and understanding, the term "CVFDR" will refer to one or more devices comprising a CVR, or an FDR, or both. The CVFDR can include an electronic interface and a housing that encloses each circuit, and can include a crash survivable memory unit (CSMU). The CSMU typically includes a non-volatile memory for storing flight data and voice data. Other flight recorder devices or modules such as data analytics modules (DA) can be arranged to receive flight data corresponding to various predetermined flight parameters from various devices including other flight recorder modules in the flight recorder system, and can include a dedicated processor to perform an analysis of the data. The analysis can be conducted during flight by the DA, or post-flight. Flight recorder devices can include any number of devices or modules configured to capture data indicative of any desired number of parameters relative to the aircraft, including detected, measured, sensed, calculated, derived, or otherwise determined data.

Flight recorders devices can be configured as a set of fixed aircraft components, such as a set of line-replaceable units (LRUs). In many instances, the flight recorder LRU can comprise a FRM that receives and processes audio or other flight data from various data sources such as sensors, monitors, instruments, and the like. The FRM can be communicatively coupled to the CVFDR via a communication network of the aircraft to provide the data to the CVFDR in accordance with known protocols.

Some conventional FRMs can be audio data sources. For example, such audio data sources can be one or more cockpit area microphones (CAMs) and/or an aircraft intercom system (ICS). Conventional flight data audio sources (e.g., CAMs, ICSs) employ one or more audio transducers or sensors to detect, measure or otherwise provide respective audio parameter data, and generate a respective analog signal indicative of the audio parameter with respect to time. The conventional FRMs typically include local or dedicated analog-to-digital converters (ADCs) (sometimes called "coders") which sample the respective analog signal for conversion to a digitized signal. Conventional ADCs typically sample the respective analog signal at a predetermined sampling frequency using respective independent internal clocks. For example, conventional ADCs can include an internal oscillator operative to generate a sampling rate clock signal based on a predetermined sampling frequency. In other conventional techniques, a local FRM host controller generates the sampling rate clock signal (e.g., bit clock, (BCLK), or word clock, (WCLK)) from an internal clock master frequency. Once sampled and digitized, the digitized signal is then provided to the FRM host controller using a digital signal protocol, e.g., Inter-IC Sound (I2S) for transmission to the CVFDR on the data communication network of the aircraft. For example, each digitized signal can be sent to the CVFDR from a particular FRM as a sequentially transmitted set of data packets or data frames.

The digitized signals (e.g., data packets) from the audio data source FRMs to the CVFDR must be synchronized with each other with respect to the time of transmission on the aircraft data communication network. Each transmission can include any number of digitized data samples. The data packets typically include information indicative of the time of transmission, i.e., a time stamp. The FRM can time stamp the data packet at the time of transmission, for example in a data header. In some cases, for example in communication networks employing more modern Time Sensitive Network (TSN) or Time Triggered Ethernet (TTE) compliant protocols, synchronization of transmission to the FDR can be based on a master clock that all the network devices refer to. The master clock is typically automatically selected from the local network on the basis of what clocks are coupled to and available in the network, and their specifications. Based on the master clock, synchronization packets are sent to the other devices on the network. These packets measure the distance from the master device to all slave devices or nodes, and this information is used to adjust the respective slave clocks when they synchronize with the master clock for time stamping. In this way, the communication network can take differences in cable length into account, as well as differences in response times and other imperfections in the network, in order to achieve synchronous network communications.

However, even if the data packets transmitted from respective FRMs are synchronized with respect to time of transmission (e.g., with reference to a time stamp from a master clock), data synchronization issues between multiple FRMs can still occur due to variance in the respective sampling rates when converting analog signals by the ADCs in the multiple FRMs. For example, although the respective internal clocks used by the ADCs of conventional FRMs are nominally operated to sample respective analog signals at a common predetermined frequency (fs), such as 8 kilohertz (kHz), 16 kHz, or 32 kHz, there can be slight variation between the actual internal clock frequencies of some devices. Additionally, even if individual FRM internal clocks are operated at a common predetermined frequency, the actual clock frequency of each respective FRM may vary slightly over the life of the particular FRM.

Furthermore, the accuracy of the respective internal clock of different FRMs can vary with respect to each other over different environmental parameters, such as temperature. By way of example, in one instance, two conventional FRMs including conventional ADCs on an aircraft in flight can be configured to sample respective analog audio signals at a nominally equal sampling frequency of 16 kHz. However, in operation, the respective ADCs may actually operate based on slightly different sampling clock frequencies of 16000.0 Hz and 15980.0 Hz, respectively, to independently sample the respective audio signals at two slightly different sampling frequencies. This difference in actual sampling frequencies can then result in data packets transmitted by different FRMs to contain different numbers of samples from each other. That is, in this particular example, even if the data packets from the different FRMs are transmitted with synchronized time stamps indicating the time of transmission to the CVFDR, the ADC operating with the actual sampling clock frequency of 15980.0 Hz would transmit a data packet having 20 fewer data samples for every second of sampling than the ADC operating with the actual sampling clock frequency of 1600.0 Hz.

For short duration recordings or flights, such a relatively slight variance in sampling frequencies may not be problematic. However, for relatively longer duration (e.g., 20 hours) recordings or flights, even a slight variance in the respective actual sampling frequencies, and the consequent variance in the sampling frequencies between the two FRMs, will cause the concurrent playback of the data or audio streams at their nominal sampling frequency (e.g., 16 kHz) to increasingly deviate over time, such that they will not be synchronized.

This lack of synchronization of sampling rates by multiple ADCs can result in a number of issues. For example, one aircraft industry standard for CVR devices, EUROCAE ED-112A, requires audio streams to be "deduced to within 4 milliseconds over the recording period." In many instances, particularly for very long flights, the audio recording period can be up to 25 hours. Variances in the respective sampling frequencies between the two FRMs, will cause the concurrent playback of the audio streams at their nominal sampling frequency (e.g., 16 kHz) to increasingly deviate, such that they will not be synchronized within the required 4 milliseconds over the recording period. In order to meet the industry standards, the audio streams from the two FRMs would then need to be further processed to calculate or estimate a common sample rate and convert the data based on the calculated common sample rate. Typically, this further processing requires computing, either in real time by the FDR, or subsequent processing by another computing device, an actual sample rate conversion (SRC), and then converting to the data or audio stream based on the computed sample rate (e.g., 16 kHz). Such processing and conversions, particularly if done in real time, can consume a large amount of processing bandwidth, especially for systems with multiple FRMs. Additionally, the processing and conversion of the sampled data can create other inaccuracies (e.g., spurious noise or artifacts) in the processed data stream. It would be desirable for CVFDRs receiving and recording multiple data or audio streams from FDRs to have the FDRs employ respective ADCs that operate based on sampling rates that are synchronized with respect to each other prior to transmitting the data.

FIG. 1 depicts an aircraft 10 that provides an example of an environment in which aspects of this disclosure can be implemented. The aircraft 10 can fly a route from one location to another (i.e., a flight) and can include one or more propulsion engines 11 coupled to a fuselage 14. A cockpit 16 can be positioned in the fuselage 14 and wing assemblies 18 can extend outwardly from the fuselage 14. Further, a set of aircraft systems 20 that enable proper operation of the aircraft 10 can be included as well as a controller or computer 22, and a data communication network 12 having a communication link 24. The aircraft computer 22 can include a master clock computing function 29. The master clock computing function can form a portion of the computer 22, or can be embodied in a separate device or system communicatively coupled to the computer 22, for example via the data communication network 12 or the communication link 24, or both. The aircraft computer 22 can also include or be communicatively coupled with a display (not shown). The display can be any user interface, screen, or known computer system or combination or computer systems that can communicate or otherwise provide an output to one or more users (e.g., a pilot) of the computer 22. In non-limiting aspects, the aircraft computer 22 can comprise a Flight Management System (not shown).

The set of aircraft systems 20 can reside within the cockpit 16, within the electronics and equipment bay (not shown), as well as in other locations throughout the aircraft 10. Such aircraft systems 20 can include but are not limited to an electrical system, an oxygen system, hydraulics or pneumatics system, a fuel system, a propulsion system, FMS, flight controls, audio/video systems, an Integrated Vehicle Health Management (IVHM) system, and systems associated with the mechanical structure of the aircraft 10. As discussed in more detail herein, in aspects, the set of aircraft systems 20 can include a flight recorder system 21.

The aircraft computer 22 can be operably coupled to the set of aircraft systems 20 and it is contemplated that the aircraft computer 22 can aid in operating the set of aircraft systems 20 and can receive information from the set of aircraft systems 20. The aircraft computer 22 can also be connected with other controllers or computers of the aircraft 10. Additionally, or alternatively, the computer 22 can be communicatively coupled with a remote server (not shown) or a designated ground station 32, or both. The ground station 32 can be any type of communicating ground station 32 such as one operated by an Air Navigation Service Provider (ANSP)/Air Traffic Control (ATC).

The aircraft computer 22 can include memory (not shown), the memory can include Random Access Memory (RAM), Read-Only Memory (ROM), flash memory, or one or more different types of portable electronic memory, such as discs, Digital Versatile disks (DVD), Compact Disc-Read-Only Memory (CD-ROMs), etc., or any suitable combination of these types of memory. The aircraft computer 22 can include one or more controller modules or processors 28, which can be running any suitable programs. It will be understood that the aircraft computer 22 can include or be associated with any suitable number of individual microprocessors, power supplies, storage devices, interface cards, auto flight systems, flight management computers, controller modules, and other standard components and that the aircraft computer 22 can include or cooperate with machine executable code, any number of software (also sometimes called "firmware") programs (e.g., flight management programs), or other instructions designed to carry out the various methods, process tasks, calculations, and control/display functions necessary for operation of the aircraft 10. While not illustrated, it will be understood that any number of sensors or other systems can also be communicatively or operably coupled to the aircraft computer 22 to provide information thereto or receive information therefrom.

The flight recorder system 21 can include a set of fixed aircraft components, such as a set of line-replaceable units (LRUs) 31 which can define networking end nodes (also referred to as "end stations". "end points", or "end systems"), or modular components of the aircraft 10. The LRUs 31 can include respective control modules and be configured to operate according to a particular operation, interoperability, or form factor standards, such as those defined by ARINC664 series or Mil-Std-1553B, standards, for example. In the exemplary aspects illustrated, the aircraft computer 22 can be positioned near the nose or cockpit of the aircraft 10 while the LRUs 31 can be positioned throughout the aircraft 10. The aircraft computer 22 and LRUs 31 can be configured to be communicatively coupled by way of the data communication network 12. The data communication network 12 can comprise a series of data transmission pathways 13, including network bridges or switches (not shown). The data transmission pathways 13 can include a physical connection between the respective components or end nodes of the data communication network 12 such as the aircraft computer 22 and LRUs 31. In non-limiting aspects, the physical connection can comprise a wired connection such as Ethernet, or can include wireless transmission connections including, but not limited to, Wi-Fi (e.g., 802.11 networks), Bluetooth, and the like. Collectively, the aircraft computer 22, LRUs 31, data transmission pathways 13, and network switches can form the data communication network for the aircraft 10. It is contemplated that in various aspects, the data communication network 12 can be arranged and operated in accordance with any desired data communication schema such as, without limitation, TSN, TTE, Peripheral Component Interconnect Express (PCIe), Ethernet 10/100, and the like, without departing from the scope of the invention.

The LRUs 31 can include, for example, entirely contained systems, sensors, transducers, instruments, cameras, recorders, processors, or other auxiliary equipment to manage or operate flight recorder functions. At least a set of LRUs 31 can, for example, generate data, which can be modified, computed, or processed prior to, or in preparation for, packaging the data into data frames or data packets to be transmitted over the data communication network 12 by way of the data transmission pathways 13. In non-limiting aspects another set of LRUs 31 can consume the data transmitted over the avionics data network. In some instances, the aircraft computer 22 or LRU 31, or both, can operate to generate or consume data, or both. As used herein, "consume," "consuming," or "consumption" of data will be understood to include, but is not limited to, performing or executing a computer program, routine, calculation, analysis, function, or process on at least a portion of the data, storing the data in memory, or otherwise making use of at least a portion of the data.

The communication link 24 can be communicably coupled to the aircraft computer 22 or other control modules or processors of the aircraft to transfer information to and from the aircraft 10. It is contemplated that the communication link 24 can be a wireless communication link and can be any variety of communication mechanism capable of wirelessly linking with other systems and devices and can include, but is not limited to, satellite uplink, SATCOM internet, very high frequency (VHF) Data Link (VDL), ACARS network, Automatic Dependent Surveillance-Broadcast (ADS-B), Wireless Fidelity (Wi-Fi), WiMax, 3G wireless signal, Code Division Multiple Access (CDMA) wireless signal, Global System for Mobile communication (GSM), 4G wireless signal, Long Term Evolution (LTE) signal, 5G wireless signal or any combinations thereof. It will also be understood that the particular type or mode of wireless communication is not critical to the disclosure, and later-developed wireless networks are certainly contemplated as within the scope of the current disclosure. Further, the communication link 24 can be communicably coupled with the aircraft computer 22 through a wired link without changing the scope of the aspects as described herein. Although only one communication link 24 has been illustrated, it is contemplated that the aircraft 10 can have multiple communication links 24 communicably coupled with the aircraft computer 22. Such multiple communication links can provide the aircraft 10 with the ability to transfer information to or from the aircraft 10 in a variety of ways. Additionally, or alternatively, the computer 22 can communicate with the remote server (not shown) located at or communicatively coupled to the designated ground station 32. Communication can be sent or received between the ground station 32 and the computer 22 via the communication link 24.

Figure 2:
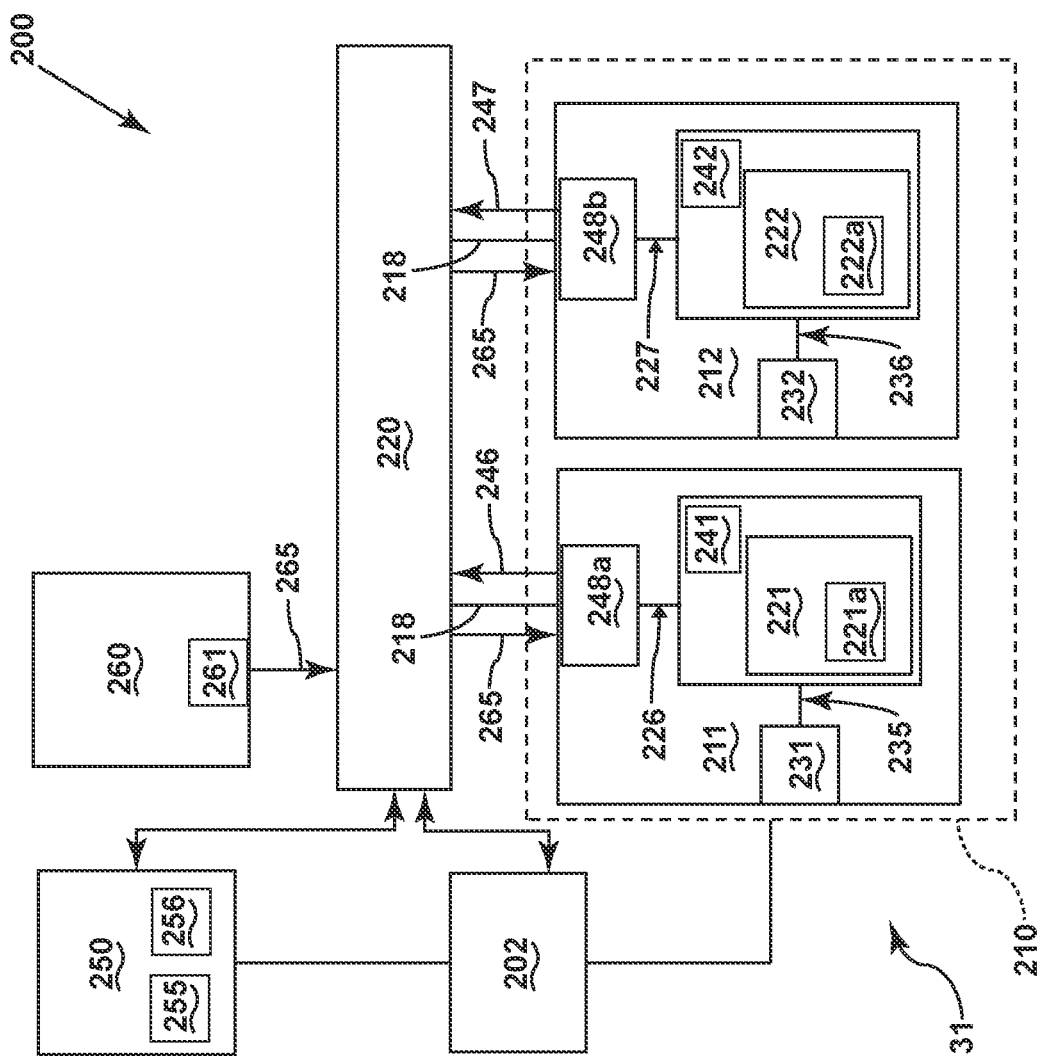
FIG. 2 is a block diagram of an example flight recorder system that can be utilized with the aircraft and ground system of FIG. 1, in accordance with aspects described herein.

FIG. 2 illustrates a functional block diagram of a non-limiting aspect of a flight recorder system 200. The flight recorder system 200 can include a CVFDR 250 and an LRU 31 comprising a set of flight recorder modules (FRM) 210. The CVFDR 250 can comprise a respective CVFDR memory 255 and a CVFDR controller 256. In non-limiting aspects, CVFDR 250 can be coupled to the set of flight recorder modules (FRM) 210 via a data communication network 220. As illustrated, in non-limiting aspects the CVFDR 250 can additionally be communicatively coupled, via the data communication network 220, and a set of communication links 218 to the set of FRMs 210. The CVFDR 250 can also be communicatively coupled to a data bus (not shown) of the aircraft via a data bus interface 202. In non-limiting aspects, the data communications network 220 can comprise a data communications network of the flight recorder system 200. In other aspects, the data communications network 220 can additionally, or alternatively, comprise the data communications network of the aircraft 10.

In some aspects, the set of FRMs 210 can include a first FRM 211 and a second FRM 212. For example, in one non-liming aspect, the first FRM 211 can be a CAM 211, and the second FRM 212 can be an ICS 212. While aspects of the first and second FRM 211, 212 are described herein, for ease of understanding, in terms of a CAM 211 and an ICS 212, other aspects are not so limited. It is contemplated that the first and second FRM 211, 212 can comprise any desired FRM 210 directed to data collection and recording of other desired aircraft performance and operational data. without departing from the scope of the disclosure. It is further contemplated that in other aspects, the set of FRMs 210 can optionally include any number of other FRM (not shown) directed to data collection and recording of other desired aircraft performance and operational data. In non-limiting aspects, the set of FRMs 210 can comprise a single LRU 31. In other aspects the set of FRMs 210 can be combined into fewer physical entities, for example by combining the respective functions of one or more FRMs 210 onto one or more circuit card assemblies (not shown).

Each FRM 210 can include a respective transducer or sensor to measure, detect, or otherwise sense a predetermined parameter. For example, the first FRM 211 can include a first sensor 231 configured to sense a first parameter, and the second FRM 212 can include a second sensor 232 configured to sense a second parameter. The first and second sensors 231, 232 are arranged to provide a respective analog output signal indicative of the measured or sensed parameters (e.g., audible sound). For example, the first sensor 231 is configured to generate a first analog signal 235, and the second sensor 232 is configured to generate a second analog signal 236. While non-limiting aspects will be described herein for ease of understanding, as including a first FRM 211 having a first sensor 231 and a second FRM 212 having a second sensor 232, other aspects are not so limited. It is contemplated the first sensor 231 or second sensor 232, or both, can comprise a respective set of first and second sensors (not shown), wherein each sensor of the set of first and second sensors is arranged to provide a respective analog output signal indicative of the measured or sensed parameter (e.g., audible sound). Furthermore, it is contemplated that when so arranged, in non-limiting aspects, each respective sensor of the first and second set of sensors can be configured to generate a respective first or second analog signal that can be mixed or combined with the other respective first or second analog signals of the other first and second sensors to provide a resultant first or second analog output signal 235, 236. For example, a particular instance of a first FRM arranged as a CAM 211 having a CAM sensor 231 can include first transducer (not shown) in the cockpit area configured to output a respective analog signal indicative of ambient sounds in the cockpit, and further include a second transducer (not shown) configured to output a respective analog signal indicative of sounds generated in a flight crew headphone or intercom during a flight. The analog signals from the first and second transducers can be mixed or combined by the CAM 211 to provide the first analog signal 235.

Additionally, each FRM can include a respective ADC. For example, the first FRM 211 can comprise a first ADC 221, and the second FRM 212 can comprise a second ADC 222. The first ADC 221 and second ADC 222 are configured to independently perform periodic sampling of the respective first and second analog signals from the first and second transducers, and to convert the sampled first and second analog signals 235, 236 to a first digital data signal 226 and a second digital data signal 227. The periodic sampling is triggered by a periodic clock signal at the predetermined sampling frequency. In non-limiting aspects, each FRM can optionally include an internal clock. For example, the first FRM 211 can include an internal first clock 221a, and the second FRM 212 can include an internal second clock 222a. The internal first and second clocks 221a, 222a can be communicatively coupled to the first and second controller 241, 242, respectively, or the first and second ADC 221, 222, respectively, or both.

Each FRM 210 can further comprise a respective set of input and output (I/O) ports 248 communicatively coupled to the data communication network 220. For example, the first FRM 211 can have a set of first I/O ports 248a, and the second FRM 212 can have a set of second I/O ports 248b. Each of the respective I/O ports 248 can be communicatively coupled to the data communication network 220. In aspects, the sets of first and second I/O ports 248a, 248b can comprise a respective memory-mapped I/O port. In non-limiting aspects, each set of first and second I/O ports 248a, 248b can include respective first or second I/O ports 248a, 248b associated with or dedicated to a set of channels. For example, in some aspects, a particular first or second I/O port 248a, 248b can be associated with or dedicated to a receipt of a clock signal including time synchronization information, while another particular first or second I/O port 248a, 248b can be associated with or dedicated to the receipt of a sensed or analog signal.

Each FRM 210 can further include a respective controller or processor. For example, the first FRM 211 can include a first controller 241 such as a CAM controller 241, and the second FRM 212 can include a second controller 242 such as an ICS controller 242. Each respective first and second controller 241, 242 can be configured to run any suitable programs or program code. While not shown, it will be understood that each FRM 210 can include or be associated with any suitable number of individual microprocessors, power supplies, storage devices, interface cards, controller modules, and other standard components and that the respective FRM 210 can include or cooperate with machine executable code, any number of software programs (e.g., data recording programs), or other instructions designed to carry out the various methods, process tasks, calculations, and control/display functions necessary for the intended operation of the respective FRM 210. The respective first and second controller 241, 242 can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. For example, in non-limiting aspects, the respective first and second controllers 241, 242 can comprise a respective set of field programmable gate arrays (FPGA) (not shown) having addressable memory-mapped registers.

In non-limiting aspects, the data communication network 220 can define a network mesh or switch fabric comprising a set of communicatively coupled network switches or bridges (not shown) such as Ethernet switches. In other non-limiting aspects, the data communication network 220 can be configured in accordance with TSN schema, or a TTE schema, to communicate data using standard methods for time synchronization and traffic management, allowing deterministic communication over a standard Ethernet network. It is contemplated that the data communication network 220 can comprise any desired schema, communication bus, or bus topology that would enable aspects to operate as described herein without departing from the scope of the disclosure. For example, in non-limiting aspects, the data communication network 220 can comprise a high-speed serial bus compliant with a PCIe schema. In such non-limiting aspects having a PCIe compliant point-to-point topology, the set of separate respective communication links 218 can communicatively couple each FRM 210 to the data communication network 220 to enable full-duplex communication of data packets between any two end nodes (e.g., the FRM 210 or CVFDR 250), with no inherent limitation on concurrent access between multiple end nodes. In non-limiting aspects, the set of communication links 218 can communicatively couple one or more FRM 210 to the CVFDR 250, the data communication network 220, data bus interface 202, the data bus (not shown) of the aircraft, various data acquisition devices (not shown) of the aircraft, or any combination thereof. The set of communication links 218 can comprise any one or more of serial links, parallel data bus links, or other conventional communication links. It will be understood that aspects employing a PCIe schema can be programmed to detect and configure the FRM 210 devices when communicatively coupled to the data communication network 220.

The CVFDR memory 255 can include Random Access Memory (RAM), Read-Only Memory (ROM), flash memory, or one or more different types of portable electronic memory, such as discs, Digital Versatile disks (DVD), Compact Disc-Read-Only Memory (CD-ROMs), etc., or any suitable combination of these types of memory. In some aspects, the CVFDR memory 255 can be configured as a shareable memory.

The CVFDR 250 controller 256 can be configured to run any suitable programs or program code to enable aspects to operate as described herein. While not shown, it will be understood that each CVFDR 250 can include or be associated with any suitable number of individual microprocessors, power supplies, storage devices, interface cards, controller modules, and other standard components and that the respective CVFDR 250 can include or cooperate with machine executable code, any number of software programs (e.g., data recording programs), or other instructions designed to carry out the various methods, process tasks, calculations, and control/display functions necessary for the intended operation of the respective CVFDR 250. The CVFDR 250 can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof.

The CVFDR 250 can be communicatively coupled to a data bus or data communication network (not shown) of the aircraft 10 via a data bus interface 202. The flight recorder system 200 can receive or collect data from the first or second FRM 211, 212 and provide the data to the CVFDR 250 via the data bus or data communication network 220.

The flight recorder system 200 can additionally receive or collect data from the data bus or data communication network 220 and provide the data to one or more of the first and second FRM 211, 212.

In aspects, a master clock computing function 260 can be communicatively coupled to the data communication network 220. In non-limiting aspects, the master clock computing function 260 can be embodied in a separate device or system communicatively coupled to the aircraft computer 22. In other aspects, the master clock computing function 260 can include or cooperate with the master clock computing function 29 of the aircraft computer 22. The master clock computing function 260 is configured to provide a master clock signal 265 to the LRUs 31 via the data communication network 220 in accordance with known protocols. The master clock signal 265 can be a timing signal that is indicative of a predetermined sampling frequency (e.g., 16 kHz). In various aspects, the master clock signal 265 can comprise a waveform, pulse, time stamp, or a combination thereof. The master clock computing function 260 can include an internal clock 261.

In some non-limiting aspects, the master clock computing function 260 can comprise a network time protocol (NTP) server (not shown). It is contemplated that in non-limiting aspects, the NTP server can be coupled to another server such as a local time server or a public time server (not shown) to receive clock signals therefrom. For example, in non-limiting aspects, the other server can be communicatively coupled to a United States GPS satellite constellation, a Network Time Protocol server, the CDMA cellular phone network, a modem connection to a time source, and the like. In some aspects, the master clock computing function 260 can be configured to adjust or correct the internal clock 261 based on clock signals received form the other server.

In operation, the first sensor 231 of the first FRM 211, and the second sensor 232 of the second FRM 212 can independently sense audio or sound. For example, in non-limiting aspects, the first sensor 231 can comprise a conventional CAM sensor 231 configured to sense sound events in the cockpit. In another example, the second sensor 232 can comprise a conventional ICS sensor 232 configured to sense spoken sound events. The first sensor 231 can generate the first analog signal 235 indicative of the first parameter (e.g., cockpit sounds), and provide the first analog signal 235 to the first ADC 221. The second sensor 232 can generate the second analog signal 236 indicative of the second parameter (e.g., spoken sounds in the cockpit), and provide the second analog signal 236 to the second ADC 222. The first ADC 221 is configured to sample the first analog signal 235 at a predetermined frequency (e.g., 16 kHz), and then digitize the sampled first analog signal 235 to produce the first digital data signal 226. More specifically, the first ADC 221 is configured to sample the first analog signal 235 based on a respective clock signal indicative of the predetermined frequency.

Similarly, the second ADC 222 is configured to sample the second analog signal 236 at the predetermined frequency (e.g., 16 kHz), and then perform an operation to digitize the sampled second analog signal 236 to produce the second digital data signal 227. More specifically, the second ADC 222 is configured to sample the second analog signal 236 based on a respective clock signal indicative of the predetermined frequency.

In contrast to conventional techniques, which typically use the respective internal clocks of the ADCs as internal sampling rate clocks that independently generate respective clock signals, without any synchronization therebetween, to trigger the respective sampling of the analog signals at the predetermined sampling frequency, in certain aspects, the first and second FRM 211, 212 instead receive the master clock signal 265 and synchronize the respective sampling operation of the first and second clocks 221a, 221b based on the master clock signal 265.

For example, in operation, the master clock computing function 260 can send or transmit the master clock signal 265 to one or more devices via the data communication network 220, such as the computer 22, or the first and second controllers 241, 242, or the first and second ADC 221, 222 or combinations thereof. In some aspects, the master clock computing function 260 can transmit the master clock signal 265 to the computer 22, which can then send the master clock signal 265 to other devices coupled to the data communication network 220, such as the first and second controllers 241, 242, or the first and second FRM 211, 212. The first FRM 211 and second FRM 212 can receive the master clock signal 265, for example, via the communication links 218, at their respective I/O ports 248a, 248b. The master clock computing function 260 can be configured to encode the master clock signal 265 to indicate to recipient or consumer devices (such as the first FRM 211 and second FRM 212) that the master clock signal 265 includes time synchronization information. The time synchronization information can include data indicative of a reference time, such as a local time. In some non-limiting aspects, the master clock signal 265 can comprise a carrier wave. In non-limiting aspects, the master clock signal 265 can include one or more pulse(s). In some aspects, at least a portion of the master clock signal 265 can be modulated or amplitude shift keyed. In other non-limiting aspects, the master clock signal 265 can be provided from the master clock 260 as a time stamp to the first or second controllers 241, 242, or both. The first and second controllers 241, 242 can compensate or adjust the internal first and second clocks 221a, 222a, respectively, based on the time stamp of the received master clock signal 265, for example, by using an oscillator tuning circuit, to control or adjust the sampling frequency of the first and second ADC 221, 222 based on the received master clock signal 265. By adjusting the internal first and second clocks 221a, 222a, based on the received master clock signal 265, the sampling frequency of the first and second ADC 221, 222 are synchronized with each other based on the received master clock signal 265.

Regardless of the waveform or encoding of the master clock signal 265, in non-limiting aspects, the first and second FRMs 211, 212 synchronize the respective sampling operations of the first and second ADC 221, 222, based on the master clock signal 265, without need of a local or internal first and second ADC clock 221a, 222a to generate respective clock signals. For example, in non-limiting aspects, the first and second ADC 221, 222, can sample the first and second analog signal 235, 236 at a predetermined common multiple of the master clock signal 265 frequency (e.g., 16 kHz).

The first ADC 221 can then convert the first analog signal 235 to the first digital data signal 226 and then provide the first digital data signal 226 to the first controller 241. Similarly, the second ADC 222 converts the second analog signal 236 to the second digital data signal 227 and then provides the second digital data signal 227 to the second controller 242.

In non-limiting aspects, the first controller 241 transmits the first digital data signal 226 to the CVFDR 250 via the data communication network 220, as a set of first data packets 246 or data frames. The first data packets 246 can have any desired size, containing any desired number of digitized data samples. Each first data packet 246 can be indicative of a portion of the first digital data signal 231 (e.g., 20 milliseconds (ms)), the portion being based on the predetermined sampling frequency (e.g., 16 kHz) and the desired size of the first data packets 246 (e.g., 320 samples). In non-limiting aspects, the second controller 242 transmits the second digital data signal 227 to the CVFDR 250 via the data communication network 220, as a set of second data packets 247 or data frames. The second data packets 247 can have any desired size, containing any desired number of digitized data samples. Each second data packet 247 can be indicative of a portion of the second digital data signal 227 (e.g., 20 ms), the portion being based on the predetermined sampling frequency (e.g., 16 kHz) and the desired size of the second data packets 247 (e.g., 320 samples).

The first and second data packets 246, 247 can include information indicative of the time of transmission, i.e., a time stamp. The first controller 241 and second controller 242 provide time stamp information in the data first data packets 246 and second data packets 247, respectively, at the time of transmission to the CVFDR 250, for example in a data header of each first and second data packet 246, 247. In aspects, the first controller 241 and second controller 242 can determine the time stamp information based on the master clock signal 265 received from the master clock computing function 260. In non-limiting aspects, the time of transmission can be indicative of a time of a start of a sampling time period for the data in the corresponding first data packet 246 or second data packet 247. In other non-limiting aspects, the time of transmission can be indicative of the time of an end of the sampling time period for the data in the corresponding first data packet 246 or second data packet 247. Regardless of the particular sampling time period indicated by the time stamp information, the time of transmission indicated by the time stamp is based on the master clock signal 265 received from the master clock computing function 260.

In this way, both synchronization of the sampling frequency by the first and second ADC 221, 222, and synchronization of the transmission times of the first and second digital data signal 226, 227 by the first and second ADC 221, 222 to the CVFDR 250 via the data communication network 220, are based on the master clock signal 265 from the master clock computing function 260 without need of a local or internal first and second ADC clock 221a, 222a to generate respective clock signals.

FIG. 3 illustrates a non-limiting example of a method 300 of operating the flight recorder system 200 of an aircraft 10. The method 300 can be performed while the aircraft 10 is in-flight, pre-flight (e.g., prior to executing a flight plan), or post-flight (e.g., subsequent to a flight). Although described in terms of a flight recorder system 200, it will be appreciated that the method 300 can be applied to any suitable avionics device configured to sample data and transmit the data to any other suitable other avionics device. While the method will be described herein, for ease of understanding, in terms of the aircraft 10 of FIG. 1 and the flight recorder system 200 of FIG. 2, other aspects are not so limited and method 300 can be implemented with any desired flight recorder system on any desired aircraft without departing from the scope of the disclosure.

The flight recorder system 200 can include the CVFDR 250 and the LRU 31 comprising a set of flight recorder modules (FRMs) 210. The CVFDR 250 can be coupled to the set of FRMs 210 via a data communication network 220. In non-limiting aspects, the data communications network 220 can comprise a data communications network of the flight recorder system 200. In other aspects, the data communications network 220 can additionally, or alternatively, comprise a data communications network 220 of the aircraft 10. The master clock computing function 260 can also be communicatively coupled to the data communication network 220. In non-limiting aspects, the master clock computing function 260 can be the be embodied in a separate device or system communicatively coupled to the aircraft computer 22. In other aspects, the master clock computing function 260 can include or cooperate with the master clock computing function 29 of the aircraft computer 22. The master clock computing function 260 can provide the master clock signal 265 to the LRUs 31 via the data communication network 220 in accordance with known protocols. The master clock signal 265 can be a timing signal that is indicative of a predetermined sampling frequency (e.g., 16 kHz). In various aspects, the master clock signal 265 can comprise a waveform, pulse, time stamp, or a combination thereof. The master clock computing function 260 can include the internal clock 261.

In some aspects, the set of FRMs 210 can include the first FRM 211 and a second FRM 212. For example, in one non-liming aspect, the first FRM 211 can be a CAM 211, and the second FRM 212 can be an ICS 212. The first FRM 211 can include a first sensor 231 configured to sense a first parameter (e.g., ambient sound) and to generate the first analog signal 235 indicative of the sensed first parameter. The second FRM 212 can include a second sensor 232 configured to sense a second parameter (e.g., intercom sound) and to generate the second analog signal 236 indicative of the second sensed parameter.

The first FRM 211 can include the first controller 241 and the second FRM 212 can include the second controller 242.

Each respective first and second controller 241, 242 can be configured to run any suitable programs or program code. The first FRM 211 and second FRM 212 can optionally include the first clock 221a, and the second clock 222a, respectively. The first and second clocks 221a, 222a can be communicatively coupled to the first and second controller 241, 242, respectively, or the first and second ADC 221, 222, respectively, or both. The first FRM 211 can have the set of first I/O ports 248a, and the second FRM 212 can have the set of second I/O ports 248b, respectively, communicatively coupled to the data communication network 220.

The method 300 can include, at 310, communicatively coupling the CVFDR to the first FRM 211 via the data communication network 220. The first FRM 211 can include the first sensor 231 configured to generate the first analog signal 235, the set of input and output (I/O) ports 248 communicatively couplable to the data communication network 220, the first controller 241 and the first ADC 221.

The method 300 can include, at 320, receiving, by the first FRM 211, the second FRM 221, or both, the master clock signal 265 from the data communication network 220. The method 300 can also include, at 330, generating the first analog signal 235 by the first sensor 231 The method 300 can include at 340, sampling by the ADC 221 the first analog signal 235 based on the master clock signal 265 to convert the first analog data signal 235 to a first digital data signal 226. In non-limiting aspects, the master clock signal 265 is indicative of a predetermined sampling frequency (e.g., 16 kHz). In other non-limiting aspects, the master clock signal 265 can be provided from the master clock 260 as a time stamp to the first or second controllers 241, 242, or both. The first and second controllers 241, 242 can compensate or adjust the first and second clocks 221a, 222a, respectively, based on the time stamp of the received master clock signal 265. In some aspects, the sampling, by the ADC 221, of the first analog signal 235 can include adjusting the first clock 221a based on the received master clock signal 265. For example, the master clock signal 265 can be provided from the master clock 260 as a time stamp to the first or second controllers 241, 242, or both. The first and second controllers 241, 242 can compensate or adjust the first and second clocks 221a, 222a, respectively, based on the time stamp of the received master clock signal 265.

The method 300 can further include, at 350, transmitting the first digital data signal 226 to the CVFDR 250 via the data communication network 220 from the first controller 241. In non-limiting aspects, the first digital data signal 226 can be transmitted as a set of first data packets 246. In some non-limiting aspects, the method 300 can include, at 360, including in each first data packet 247 an indication of a first time of transmission based on the master clock signal 265.

The sequences depicted are for illustrative purposes only and is not meant to limit the method 300 in any way, as it is understood that the portions of the method can proceed in a different logical order, additional or intervening portions can be included, or described portions of the method can be divided into multiple portions, or described portions of the methods can be omitted without detracting from the described method. For example, the method 300 can include various other intervening steps. The examples provided herein are meant to be non-limiting.

For example, in non-limiting aspects, the CVFDR 250 can be communicatively coupled to the second FRM 212 via the data communication network 220. In such non-limiting aspects, the method 300 can further include for example, generating a second analog signal 236 by the second sensor 232. The method 300 can also include providing the master clock signal 265 to the second FRM 212 via the data communication network 220, and sampling, by the second ADC 212, the second analog signal based on the master clock signal 265 to convert the second analog signal 236 to a second digital data signal 227. In some aspects, the sampling, by the second ADC 212, of the second analog signal 236 can include adjusting the second clock 222a based on the received master clock signal 265. For example, the master clock signal 265 can be provided from the master clock 260 as a time stamp to the second controller 242. The second controller, 242 can compensate or adjust the second clock 222a based on the time stamp of the received master clock signal 265. The method 300 can include synchronizing the first clock 221a and the second clock 222a based on the master clock signal 265. For example, by adjusting the first or second clocks 221a, 222a, or both, based on the received master clock signal 265, the sampling frequency of the first ADC 221 can be synchronized with the sampling frequency of the second ADC 222 based on the received master clock signal 265.

The method 300 can further include transmitting the second digital data signal 227 to the CVFDR 250 via the data communication network 220 from the second controller 242. In non-limiting aspects, the first digital data signal 226 can be transmitted as a set of second data packets 247. In some non-limiting aspects, the method 300 can include, including in each second data packet 247 an indication of a second time of transmission based on the master clock signal 265.

It is contemplated that aspects of this disclosure can be advantageous for use over conventional systems or methods for configuring and operating a flight recorder. Aspects of this disclosure enable audio streams to have synchronized sampling rates without computationally-intensive sample rate conversions in real-time or additional post-recording processing to convert all streams to the sample rate (or factors thereof). For example, aspects as disclosed herein can enable real-time synchronization of the sampling frequency of ADCs in multiple FRMs, to eliminate the need for post-processing the digitized data streams received from the FRMs. Such synchronization of can reduce errors and discontinuities associated with such post processing. Additionally, such synchronization can free up computing bandwidth that would otherwise be needed for real time processing of the multiple audio streams.

It is further contemplated that aspects of this disclosure can advantageously provide synchronized sampling rates over the life of the LRU, as well as over a wide range of operational temperatures, because all conversions are synchronized by the master clock, instead of the individual LRU internal clocks which can exhibit variances over time and temperature.

It is further contemplated that aspects of this disclosure can enable simpler and less expensive CVFDR configurations, because the disclosed aspect eliminate the need to be configure and program a CVFDR to determine and perform the sample rate conversions in real-time, as with conventional systems.

To the extent not already described, the different features and structures of the various embodiments can be used in combination with each other as desired. That one feature is not illustrated in all of the embodiments is not meant to be construed that it may not be included, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

A flight recorder system of an aircraft, comprising: a cockpit voice and flight data recorder (CVFDR) communicatively coupled to a first flight recorder module (FRM); and the first FRM comprising a first sensor configured to generate a first analog signal, a first controller, and a first analog to digital converter (ADC) configured to sample the first analog signal based on a received master clock signal and convert the first analog signal to a first digital data signal, the first controller configured to provide the first digital data signal to the CVFDR.

The flight recorder system of any preceding clause, wherein the first ADC includes a first clock, and wherein the controller is further configured to adjust the first clock based on the received master clock signal.

The flight recorder system of any preceding clause, wherein the first controller is configured to transmit the first digital data signal to the CVFDR as a first set of data packets, each first data packet indicative of a portion of the first digital data signal, the portion being based on a predetermined sampling time period.

The flight recorder system of any preceding clause, wherein each first data packet includes an indication of a first time of transmission of the respective first data packet.

The flight recorder system of any preceding clause, wherein the first time of transmission is indicative of a time of one of a start of a predetermined sampling time period, or an end of the predetermined sampling time period.

The flight recorder system of any preceding clause, wherein the first time of transmission is based on the master clock signal.

The flight recorder system of any preceding clause, wherein the first FRM is configured to receive the master clock signal from a data communication network.

The flight recorder system of any preceding clause, wherein the master clock signal is provided by a master clock computing function communicatively coupled to the data communication network.

The flight recorder system of any preceding clause, wherein the CVFDR is further communicatively coupled to a second FRM comprising a second sensor configured to generate a second analog signal, a second controller, and a second ADC configured to sample the second analog signal based on a received master clock signal and to convert the second analog signal to a second digital data signal, the second controller configured to provide the second digital data signal to the CVFDR.

The flight recorder system of any preceding clause, wherein the first clock and second clock are synchronized based on the master clock signal.

A method of operating a flight recorder system of an aircraft, the flight recorder system including a CVFDR communicatively coupled to a first FRM comprising a first sensor configured to generate a first analog signal, a first controller, and a first ADC, the method comprising: receiving, by the first FRM, a master clock signal from a master clock computing function; generating a first analog signal by the first sensor; sampling, by the first ADC, the first analog signal based on the master clock signal to convert the first analog signal to a first digital data signal; and transmitting the first digital data signal to the CVFDR.

The method of any preceding clause, wherein the first ADC includes a first clock, the method further including, adjusting the first clock based on the received master clock signal.

The method of any preceding clause, wherein the transmitting the first digital data signal to the CVFDR includes providing the first digital data signal as a set of first data packets, each first data packet indicative of a respective portion of the first digital data signal, the respective portion being based on a predetermined sampling time period.

The method of any preceding clause, further comprising, including in each first data packet an indication of a first time of transmission of the respective first data packet; wherein the first time of transmission is indicative of a time of one of a start of the predetermined sampling time period, or an end of the predetermined sampling time period.

The method of any preceding clause, wherein the first time of transmission is based on the received master clock signal.

The method of any preceding clause, wherein the CVFDR is communicatively coupled to a second FRM, the second FRM comprising a second sensor configured to generate a second analog signal, a second controller and a second ADC, the method further comprising: receiving the master clock signal by the second FRM; generating a second analog signal by the second sensor; sampling, by the second ADC based on the received master clock signal to convert the second analog signal to a second digital data signal; and transmitting the second digital data signal to the CVFDR from the second controller.

The method of any preceding clause, wherein the second ADC includes a second clock, the method further including, adjusting the second clock based on the received master clock signal.

The method of any preceding clause, further comprising synchronizing the first clock and the second clock based on the master clock signal.

The method of any preceding clause, further comprising communicatively coupling the first FRM to a data communication network.

The method of any preceding clause, wherein the master clock signal is received by the first FRM from the data communication network.

What is claimed is:

1. A flight recorder system of an aircraft, comprising:
    a cockpit voice and flight data recorder (CVFDR) communicatively coupled to a first flight recorder module (FRM), the first FRM comprising a first sensor configured to generate a first analog signal;
    a master clock computing function including an internal clock configured to generate a master clock signal, the master clock computing function communicatively coupled to a server and configured to adjust the internal clock based on an input from the server;

a first controller communicatively coupled to the CVFDR; and a first analog to digital converter (ADC) communicatively coupled to the master clock computing function, configured to sample the first analog signal based on a received master clock signal and convert the first analog signal to a first digital data signal, wherein the first controller is configured to provide the first digital data signal to the CVFDR.

2. The flight recorder system of claim 1, wherein the first ADC includes a first clock, and wherein the controller is further configured to adjust the first clock based on the received master clock signal.

3. The flight recorder system of claim 2, wherein the first clock and a second clock are synchronized based on the received master clock signal.

4. The flight recorder system of claim 1, wherein the first controller is configured to transmit the first digital data signal to the CVFDR as a first set of data packets, each first data packet indicative of a portion of the first digital data signal, the portion being based on a predetermined sampling time period.

5. The flight recorder system of claim 4, wherein each first data packet includes an indication of a first time of transmission of the respective first data packet.

6. The flight recorder system of claim 5, wherein the first time of transmission is indicative of a time of one of a start of a predetermined sampling time period, or an end of the predetermined sampling time period.

7. The flight recorder system of claim 5, wherein the first time of transmission is based on the master clock signal.

8. The flight recorder system of claim 1, wherein the first FRM is configured to receive the master clock signal from a data communication network.

9. The flight recorder system of claim 8, wherein the master clock signal is provided by a master clock computing function communicatively coupled to the data communication network.

10. The flight recorder system of claim 1, wherein the CVFDR is further communicatively coupled to a second FRM comprising a second sensor configured to generate a second analog signal, a second controller, and a second ADC configured to sample the second analog signal based on the received master clock signal and to convert the second analog signal to a second digital data signal, the second controller configured to provide the second digital data signal to the CVFDR.

11. A method of operating a flight recorder system of an aircraft, the flight recorder system including a CVFDR communicatively coupled to a first FRM comprising a first sensor configured to generate a first analog signal, a first controller, a first ADC, and a master clock computing function including an internal clock configured to generate a master clock signal; the method comprising:

coupling the master clock computing function to a server;

adjusting the internal clock of the master clock computing function based on an input from the server;

receiving, by the first FRM, a master clock signal from a master clock computing function;

generating a first analog signal by the first sensor;

sampling, by the first ADC, the first analog signal based on the master clock signal to convert the first analog signal to a first digital data signal; and transmitting the first digital data signal to the CVFDR.

12. The method of claim 11, wherein the first ADC includes a first clock, the method further including, adjusting the first clock based on the received master clock signal.

13. The method of claim 12, wherein the CVFDR is communicatively coupled to a second FRM, the second FRM comprising a second sensor configured to generate a second analog signal, a second controller and a second ADC, the method further comprising:

receiving the master clock signal by the second FRM;

generating a second analog signal by the second sensor;

sampling, by the second ADC based on the received master clock signal to convert the second analog signal to a second digital data signal; and transmitting the second digital data signal to the CVFDR from the second controller.

14. The method of claim 13, wherein the second ADC includes a second clock, the method further including, adjusting the second clock based on the received master clock signal.

15. The method of claim 14, further comprising synchronizing the first clock and the second clock based on the master clock signal.

16. The method of claim 11, wherein the transmitting the first digital data signal to the CVFDR includes providing the first digital data signal as a set of first data packets, each first data packet indicative of a respective portion of the first digital data signal, the respective portion being based on a predetermined sampling time period.

17. The method of claim 16, further comprising, including in each first data packet an indication of a first time of transmission of the respective first data packet; wherein the first time of transmission is indicative of a time of one of a start of the predetermined sampling time period, or an end of the predetermined sampling time period.

18. The method of claim 17, wherein the first time of transmission is based on the received master clock signal.

19. The method of claim 11, further comprising communicatively coupling the first FRM to a data communication network.

20. The method of claim 19, wherein the master clock signal is received by the first FRM from the data communication network.

* * * * *